US010086742B2

(12) United States Patent
Piehl et al.

(10) Patent No.: US 10,086,742 B2
(45) Date of Patent: Oct. 2, 2018

(54) SECURITY ENCLOSURE WITH DUAL DOORS AND UNDER-SEAT STORAGE

(71) Applicant: Bob Barker Company, Inc., Fuquay-Varina, NC (US)

(72) Inventors: Jason S. Piehl, Apple Valley, MN (US); Nicholas A. Milleson, Cottage Grove, MN (US)

(73) Assignee: BOB BARKER COMPANY, INC., Fuquay-Varina, NC (US)

( * ) Notice: Subject to any disclaimer, the term of this patent is extended or adjusted under 35 U.S.C. 154(b) by 90 days.

(21) Appl. No.: 15/411,508

(22) Filed: Jan. 20, 2017

(65) Prior Publication Data

US 2018/0208097 A1   Jul. 26, 2018

(51) Int. Cl.
*B60P 3/03* (2006.01)
*B60N 2/01* (2006.01)
*B60J 5/10* (2006.01)

(52) U.S. Cl.
CPC .................. *B60P 3/03* (2013.01); *B60J 5/108* (2013.01); *B60N 2/01* (2013.01)

(58) Field of Classification Search
CPC ............... B60P 3/03; B60J 5/108; B60N 2/01
USPC ............................... 296/24.42, 164, 50, 57.1
See application file for complete search history.

(56) References Cited

U.S. PATENT DOCUMENTS

| | | | | |
|---|---|---|---|---|
| 2,219,412 A | * | 10/1940 | Dean | B60R 21/12 296/24.42 |
| 4,159,141 A | * | 6/1979 | Dirck | B60P 3/03 296/24.42 |
| 4,470,228 A | * | 9/1984 | Dirck | E04H 3/08 296/164 |
| 5,080,416 A | * | 1/1992 | Dirck | B60R 21/12 296/24.42 |
| 5,678,874 A | * | 10/1997 | Choate | B60J 5/101 296/164 |
| 5,890,329 A | * | 4/1999 | Krueger | B60P 3/03 119/453 |

* cited by examiner

Primary Examiner — Jason S Morrow
Assistant Examiner — E Turner Hicks
(74) Attorney, Agent, or Firm — Coats & Bennett, PLLC (57) ABSTRACT

An enclosure for positioning within a vehicle and having a secure holding cell for housing one or more persons. The enclosure includes a body that forms the holding cell to contain the persons. Benches are positioned within the interior space to accommodate the persons. An area below the benches forms a storage compartment. Access doors to the storage compartments are positioned outside of the holding cell along an exterior side of the enclosure. Doors that enclose the holding cell are movable between open and closed positions and include notches to provide access to the storage compartments.

20 Claims, 6 Drawing Sheets

SECURITY ENCLOSURE WITH DUAL DOORS AND UNDER-SEAT STORAGE

BACKGROUND

The present application is directed to a security transportation enclosure and, more specifically, to an enclosure with a holding cell having a pair of rear doors that accommodate under seat storage.

It is necessary for various correctional institutions, such as prisons and detention facilities, to transport persons. This may occur when transporting persons between correctional institutions, for judicial hearings, for medical events, and a wide variety of other reasons.

Specially designed and built vehicles are available for transporting persons. These vehicles are specially built with the necessary security infrastructure for the purpose of providing secure transportation. However, these specialty vehicles are often very expensive. An alternate and commonly used option is to modify the internal cargo area of a conventional passenger van with a security enclosure. The enclosures are sized to fit within the interior of the vehicle and are sized to hold one or more persons. The enclosures should be designed to provide for a straight-forward manner to allow the persons to enter and exit. Often times the persons may be difficult to handle requiring security personnel to basically insert and remove the persons themselves.

The enclosures should also be designed to prevent the persons from being injured during the transport. This may include isolating one or more of the persons from others riding in the enclosure. This may also include preventing the persons from somehow using the enclosure to harm themselves or another person. For example, fasteners or elements of the enclosure should be inaccessible and/or securely fastened to prevent their removal and use as a weapon.

SUMMARY

The present application is directed to an enclosure configured to be assembled within an interior of a vehicle, such as a cargo van. The enclosure includes a holding cell to contain one or more persons. Compartment space is formed with the enclosure for storing a variety of different materials. The compartment space is configured to not be accessible from within the holding cell. Doors are attached to the enclosure and movable to provide and prevent access to the holding cell. The doors are further configured to prevent blocking the storage compartments.

One aspect is directed to an enclosure for transporting a person within a vehicle. The enclosure includes a body that extends around and forms an interior holding cell. The body includes an opening in a first side of the body and is sized for the person to enter into the holding cell and to exit from the holding cell. First and second benches are positioned within the holding cell and each includes a seat and a wall that extends downward from the seat. A first compartment is positioned under the first bench and a second compartment is positioned under the second bench. The first compartment is isolated from the holding cell by at least the seat and the wall of the first bench and the second compartment is isolated from the holding cell by at least the seat and the wall of the second bench. Each of the first and second compartments includes an open end positioned at the opening in the body. The enclosure also includes first and second doors that are hingedly mounted to the body on opposing sides of the opening. The doors are movable between an open position to expose the opening and allow access to and from the holding cell and a closed position that extend across the opening and encloses the holding cell. A first notch in the first door aligns with the open end of the first compartment when the first door is in the closed position, and a second notch in the second door aligns with the open end of the second compartment when the second door is in the closed position. The open ends of each of the first and second compartments are isolated from the enclosed holding cell when the first and second doors are in the closed position.

The enclosure may include that the first bench is connected to and extends outward into the holding cell from a first lateral side of the body and the second bench is connected to and extends outward into the holding cell from a second lateral side of the body. The wall of the first seat may be connected to a floor of the body and the wall of the second seat may be connected to the floor of the body.

The enclosure may include that the open ends of each of the first and second compartments are aligned with the opening in the body.

The enclosure may include a post positioned at the opening of the body with a first end connected to a floor of the body and a second end connected to an upper section of the body. The doors may be spaced away from the post in the open position and may be connected to the post in the closed position.

The enclosure may include that each of the benches extends along an entire length of the holding cell.

The enclosure may include compartment doors that extend across each of the first and second compartments at the opening with the doors being movable between open and closed positions.

Another aspect is directed to an enclosure for transporting persons within a vehicle. The enclosure includes a body with a holding cell having a length, width, and height. The length is formed between a first side and an opposing second side, the width is formed between first and second lateral sides that are spaced apart and that extend between the first and second sides, and the height is formed between a floor and a top that is attached to the first and second laterals. An opening is positioned in the first side of the body and is in communication with the holding cell. A first compartment extends along the length of the holding cell and is formed at least in part by the body. The first compartment is isolated from the holding cell by the body, and includes an open end that is aligned with the opening in the body. A second compartment extends along the length of the holding cell and is formed at least in part by the body. The second compartment is isolated from the holding cell by the body and includes an open end that is aligned with the opening in the body. First and second doors are hingedly mounted to the first side of the body on opposing sides of the opening. The first and second doors are movable between an open position to allow access to the holding cell and a closed position that extend across the opening and enclose the holding cell. A first notch is located in the first door and aligns with the open end of the first compartment in the closed position. A second notch is located in the second door that aligns with the open end of the second compartment in the closed position. The open ends of each of the first and second compartments are isolated from the enclosed holding cell when the first and second doors are in the closed position.

The enclosure may include a first bench positioned in the holding cell and including a seat and a foot section that extends from the seat with the first bench positioned to isolate the first compartment from the holding cell.

The enclosure may include a second bench positioned in the holding cell and being spaced apart from the first bench with the second bench including a seat and a foot section that extends from the seat and with the second bench positioned to isolate the second compartment from the holding cell. The seat of the first bench may be positioned over the first compartment and the seat of the second bench may be positioned over the second compartment.

The enclosure may include a post positioned at the opening of the body with a first end that is connected to the floor and a second end that is connected to the top. Each of the doors may be spaced away from the post in the open position and may be connected to the post in the closed position.

Another aspect is directed to an enclosure for transporting persons within a vehicle. The enclosure includes a body that extends around and forms an interior holding cell. The body includes an opening in a first side and that is in communication with the holding cell. First and second benches are positioned within the holding cell. A first compartment is positioned underneath the first bench and positioned outside of the holding cell. A first access door is positioned at the first compartment. A second compartment is positioned underneath the second bench and positioned outside of the holding cell. A second access door is positioned at the second storage compartment. The enclosure also includes first and second main doors hingedly mounted to the body on opposing sides of the opening. The first and second main doors are movable between an open position to allow access to the holding cell and a closed position that extend across the opening and enclose the holding cell. A first notch in the first main door aligns with the first access door of the first compartment in the closed position. A second notch in the second door aligns with the second access door of the second storage compartment in the closed position. The first and second access doors are positioned outside of the holding cell.

The enclosure may include that the first storage compartment includes a first open end that is aligned with the opening in the body and with the first access door sized and positioned to extend across the first open end. The second storage compartment may include a second open end that is aligned with the opening in the body and with the second access door extending across the second open end.

The enclosure may include that the first access door and the first notch have a common shape and size. The second access door and the second notch may also have a common shape and size.

The enclosure may include that the first and second main doors have a common shape and size.

The various aspects of the various embodiments may be used alone or in any combination, as is desired.

DETAILED DESCRIPTION

The present application is directed to an enclosure with a secure holding cell for housing one or more persons. The enclosure is configured to be installed within the interior of a cargo van. The enclosure includes a body that forms a holding cell to contain the persons. Benches are positioned within the interior space to accommodate the persons. The area below the benches forms a storage compartment. Access doors to the storage compartments are positioned outside of the holding cell along an exterior side of the enclosure. Doors that enclose the holding cell are configured to being movable between open and closed positions and include notches to provide access to the storage compartments.

Figure 1:
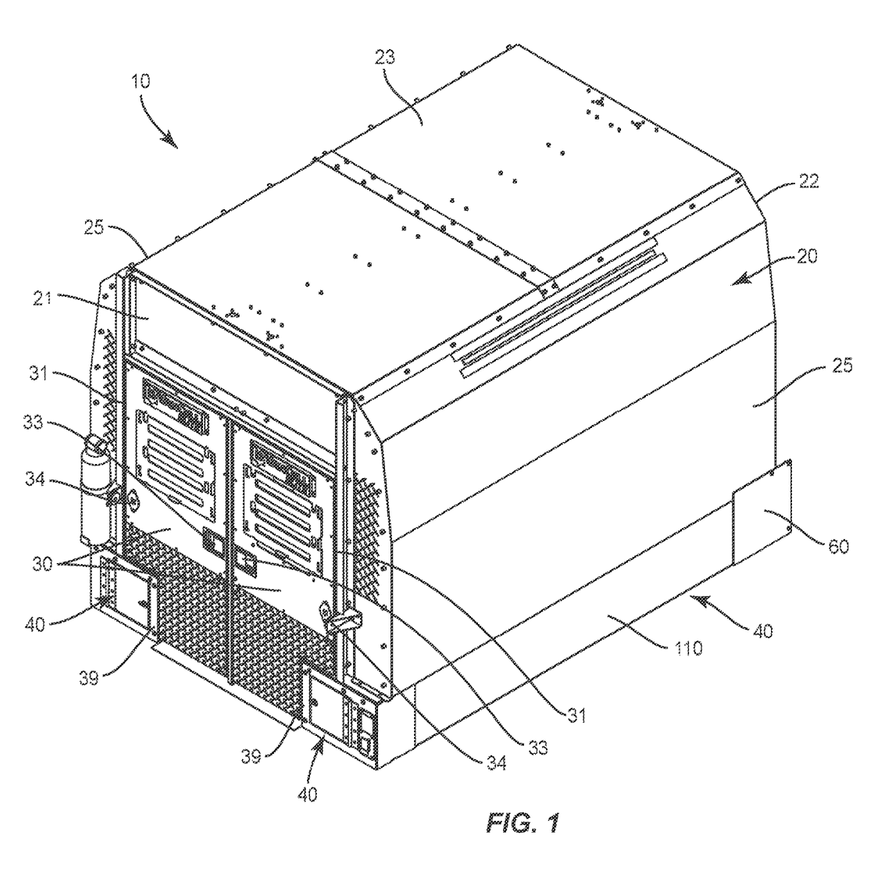
FIG. 1 is a perspective view of an enclosure with doors in a closed position.
Figure 2:
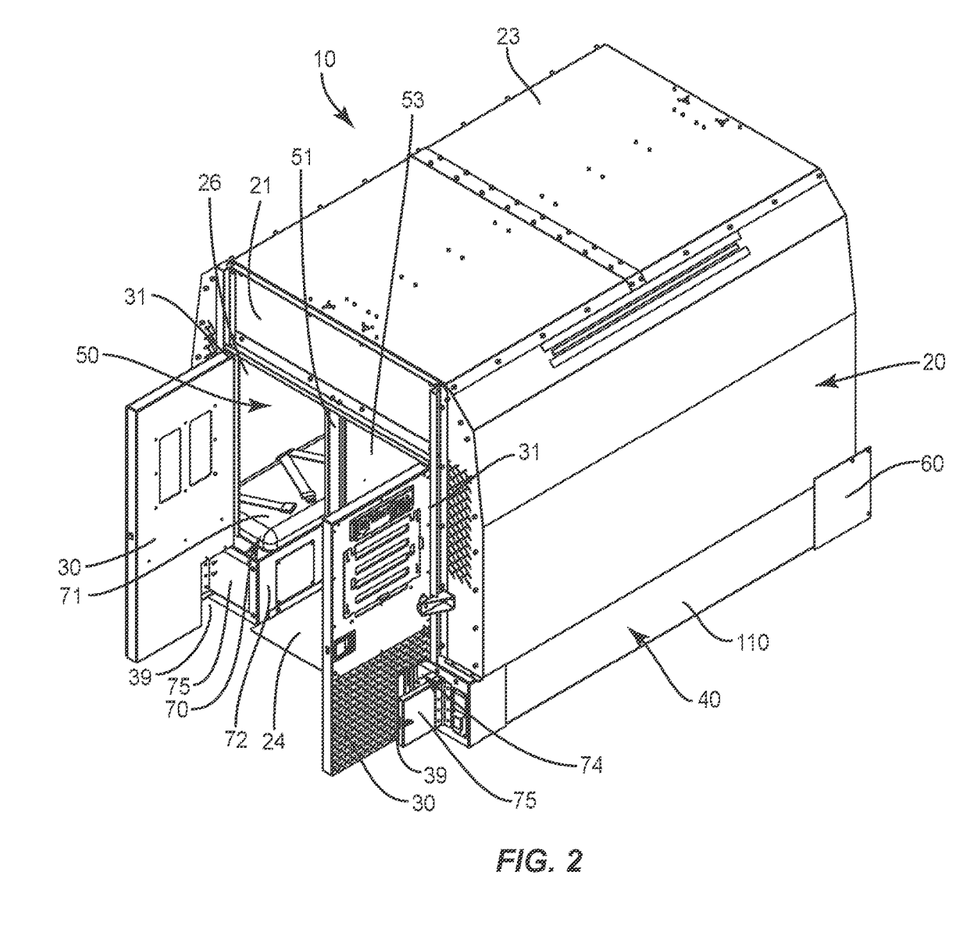
FIG. 2 is a perspective view of an enclosure with doors in an open position.

FIG. 1 illustrates the enclosure 10 in a closed position and FIG. 2 illustrates an open position. The enclosure 10 includes a body 20 that forms an interior holding cell that holds one or more persons. Benches 70 extend along the holding cell 50 to accommodate the persons. Doors 30 are attached to the body 20 and movable between open and closed positions. Storage compartments 40 extend under the benches 70. The storage compartments 40 are accessible from a rear of the enclosure 10 and are isolated from the holding cell to prevent access by the transported persons. The doors 30 include notches that are aligned with the storage compartments 40 to provide access from the exterior of the holding cell 50.

The body 20 extends around and forms the interior holding cell 50. The body 20 includes a first side 21, second side 22, a top 23, a floor 24, and lateral sides 25. The body 20 may be constructed from metal sheets that are connected together using mechanical fasteners. One aspect includes the components constructed from sheets of twelve gauge steel that are connected together by bolts. Another aspect includes the components constructed from 0.125 inch thick aluminum. The separate components are sized to fit within and be assembled within the interior of the vehicle.

The holding cell 50 is formed within the interior of the body 20. The holding cell 50 includes a length that extends between the first and second sides 21, 22, a width that extends between the lateral sides 25, and a height that extends between the top 23 and floor 24. One aspect includes the holding cell 50 having a length of about 70 inches, a width of about 61 inches, and a height of about 50 inches. Another aspect includes a length of about 52 inches. Another aspect has a height of about 50 inches.

An opening 26 is formed in the first side 21 to provide access into and from the holding cell 50. The opening 26 may include the entire first side 21, or a limited portion of the first side 21. A post 51 is positioned in the opening 26 to engage with the doors 30 in the closed position. The post 51 includes a top end that is fastened to the top 23 or portion of the first side 21, and a bottom end that is fastened to the floor 24.

A divider wall 53 as illustrated in FIG. 2 may extend along the length of the holding cell 50. The divider wall 53 extends from the post 51 to the second side 22 to form two separate sections of the holding cell 50. This provides for isolating persons by placement into the separate sections. The divider wall 53 may be fastened to one or more of the post 51, second side 22, top 23, and floor 24. The divider wall 53 may be fastened in a manner that it can be removed from the holding cell 50 when it is not necessary to isolate persons.

Removal of the divider wall 53 requires disconnecting the fasteners that secure its position.

Figure 4:
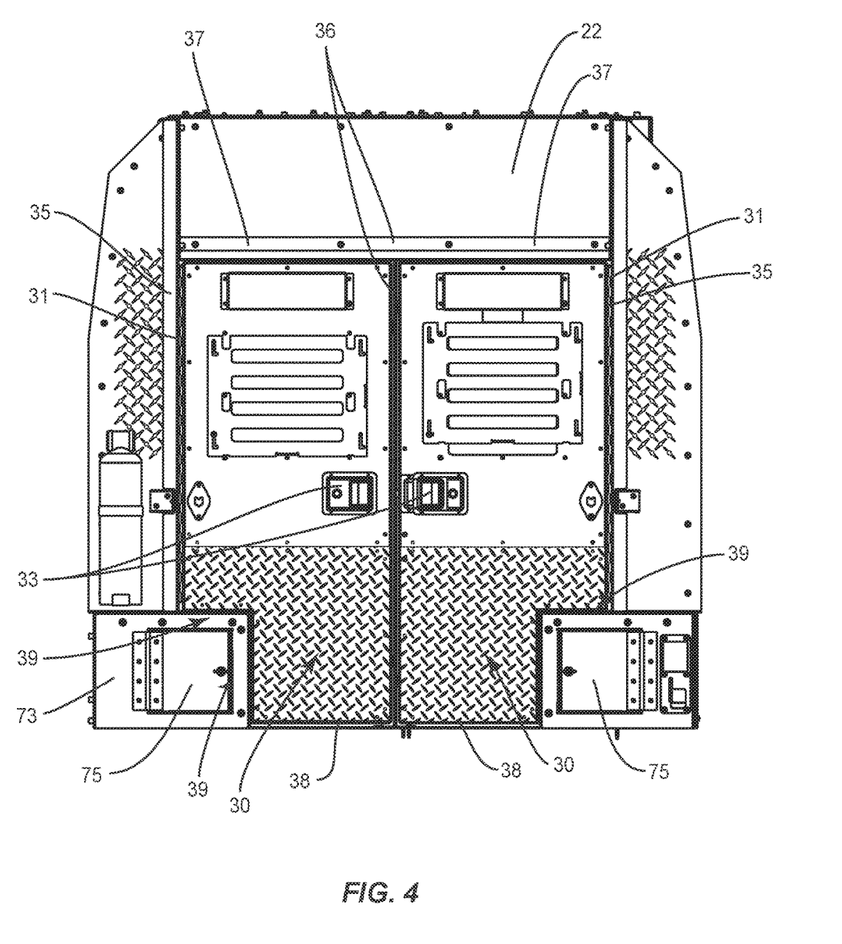
FIG. 4 is a side view of an enclosure with doors in a closed position and enclosing a holding cell.

The doors 30 are attached to the first side 21 of the body 20. As illustrated in FIG. 4, each door 30 includes an outer lateral side 35, an inner lateral side 36, an upper side 37, and an opposing lower side 38. A hinge 31 along the outer lateral side 35 provides for swinging movement between the open and closed positions. One aspect includes each of the doors 30 having the same size and shape to extend across one-half of the opening 26.

Each door 30 includes a notch 39 that is formed in the corner of the outer lateral side 35 and the lower side 38. This configuration results in the outer lateral side 35 being smaller than the inner lateral side 36, and for the lower side 38 being smaller than the upper side 37. The notch 39 of each door 30 is sized and positioned to align with the respective storage compartment 40 to provide access. In one aspect, the size and shape of each of the notches 39 matches the size and shape of an opening into the storage compartments 40.

Figure 3:
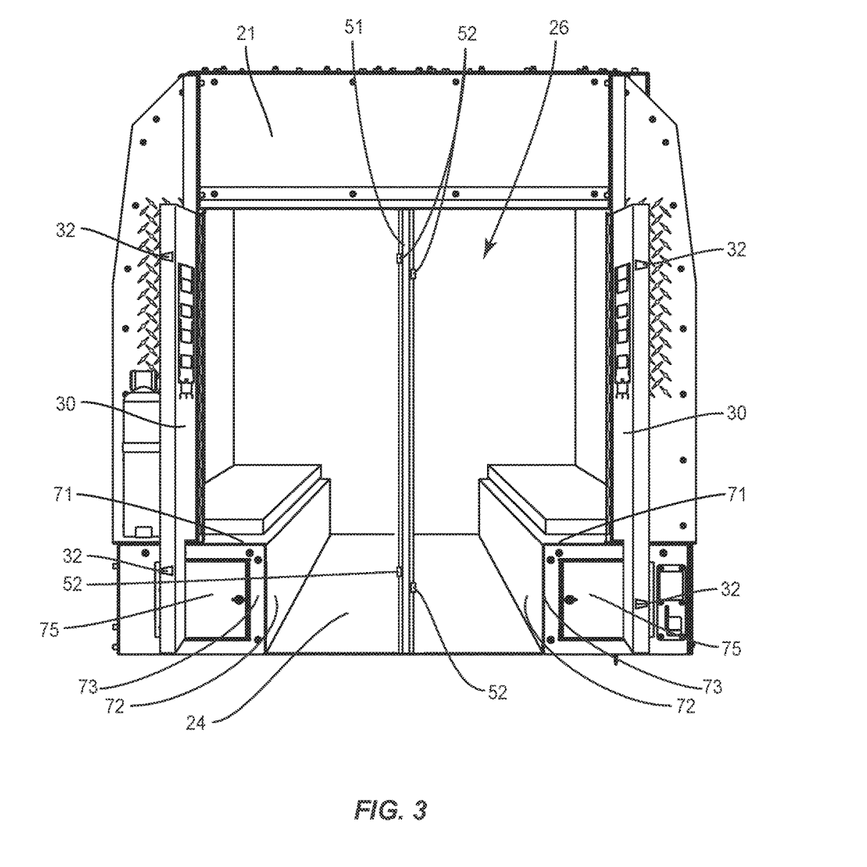
FIG. 3 is a perspective view of a holding cell within an enclosure and with doors in an open position.

The doors 30 contact against the post 51 that is positioned in the opening 26 and extends between the top 23 and the floor 24. As illustrated in FIG. 3, the post 51 includes mounts 52, and the outer lateral sides 35 of the doors 30 include receptacles 32 that are sized to receive the mounts 52. A locking mechanism within the interior of one or both doors 30 engages with the mounts 52 and provides a lock to secure the doors 30 in the closed position. One or more latches 33 (FIG. 1) are positioned on the front of the doors 30 to unlock and move the doors 30 to the open position.

Stops 34 may be attached to the body 20 and contact against the doors 30 to control an extent of movement in the open position. The stops 34 provide a contact surface against which the doors 30 contact. One aspect includes the stops 34 configured such that the doors 30 are substantially perpendicular with the front side 21 of the body 20 in the open position. This prevents the doors 30 from swinging outward beyond the lateral sides 25 of the body 20. In one aspect, the stops 34 are magnetic to attract the doors 30 and maintain them in the open position.

Figure 5:
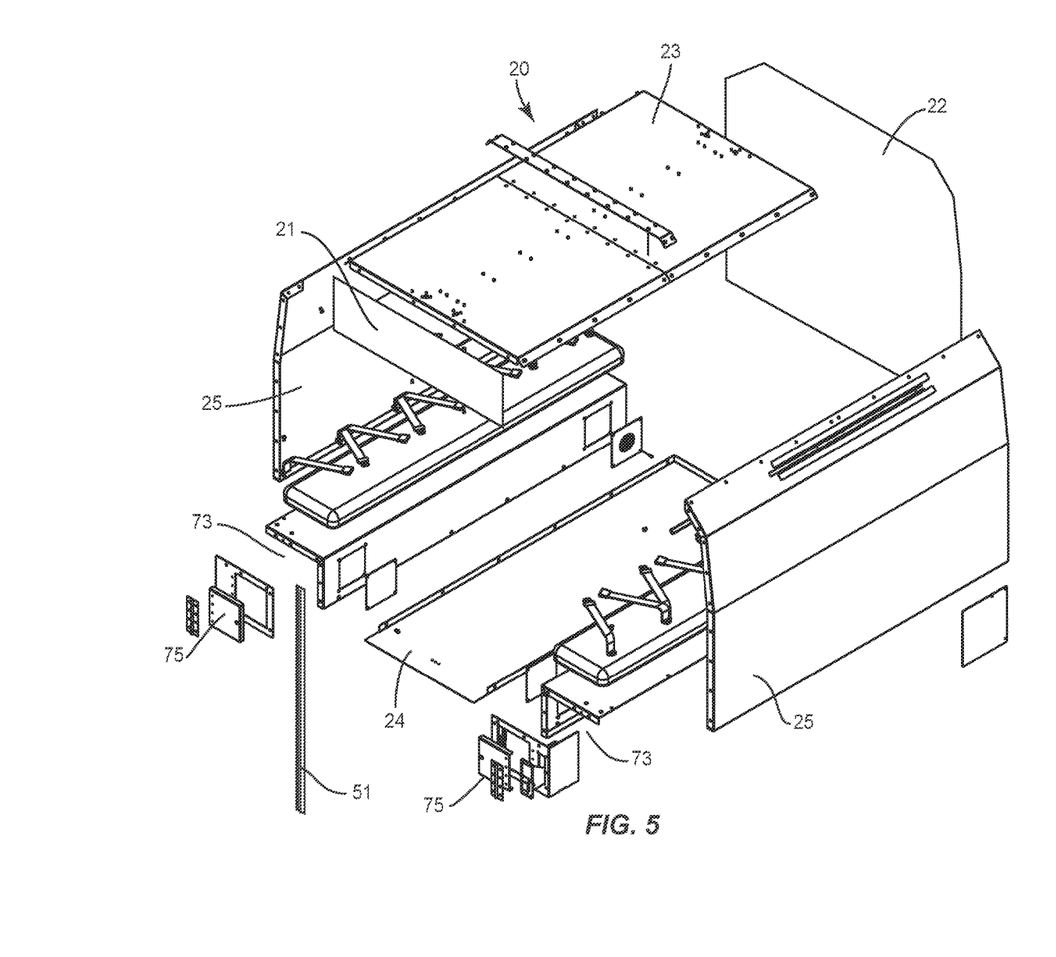
FIG. 5 is an exploded perspective view of an enclosure with the doors being omitted for clarity.

Benches 70 are positioned within the holding cell 50 to provide places for the persons to sit during transport. The benches 70 are positioned such that the lateral sides 25 of the body 20 provide a back rest. The benches 70 include a seat 71 along a top that extends outward from the lateral sides 25 and a foot wall 72 that extends downward from the top 71 to the floor 24. As best illustrated in FIG. 5, the benches 70 may include a sectional shape that resembles an L. The benches 70 extend along the length of the holding cell 50. A first end 73 of the benches 70 is positioned at the first side 21 and a second end abuts against the second side 22. The benches 70 are secured to the body 20 to prevent their removal.

In one aspect as illustrated in FIG. 5, the benches 70 connect and extend between a lower edge of the lateral sides 25 and the floor 24. Thus, the benches 70 form a wall of the holding cell 50. Other aspects may include the benches 70 overlapping with the floor 24 and/or lateral sides 25.

The area formed underneath the benches 70 is open and forms the storage compartments 40. These areas are isolated from the holding cell by the benches 70 such that a person in the holding cell 50 cannot access the storage compartments 40. Access to the storage compartments 40 is provided through the first end 73 which is positioned outside of the holding cell 50 when the doors 30 are in the closed position.

As illustrated in FIG. 5, the first ends 73 of the benches 70 are open to provide access to the storage compartments 40. A door 75 extends across each of the first ends 73 and may be positioned between an open position and a closed position. The doors 75 may each include a lock to secure it in the closed position. In one aspect as illustrated in FIG. 2, each of the doors 75 is hinged along the outer lateral edge and moves between open and closed positions in a similar manner as the door 30.

The notches 39 on the doors 30 are aligned with the first ends 73 of the storage compartments 40. This provides for the doors 75 on the front faces 73 to be accessible regardless of the position of the main doors 30. Further, the first ends 73 are positioned outside of the interior space 50 that holds the persons. Thus, persons cannot access and tamper with the doors 75 and gain access to the storage compartments 40 when they are enclosed in the holding cell 50.

The storage compartments 40 are positioned underneath each of the benches 70. The storage compartments 40 are formed by the benches 70 and the floor 110 and sidewall (not illustrated) of the vehicle. The benches 70 form at least a portion of the storage compartments 40 and also prevent access to the storage compartments from within the holding cell 50. In another aspect, the floor 24 of the body 20 extends underneath the seats 70 and forms the lower portion of the storage compartments 40.

As illustrated in FIGS. 1 and 2, support legs 60 may be positioned to support the body 20. This may include legs 60 positioned at the corners of the second side 22 and the lateral sides 25 and contact against the floor 110 of the vehicle. The doors 75 and associated frame positioned at the first end 73 of the storage compartments 50 may also support the body 20. The legs 60 and doors 75 further provide support for the benches 70.

Figure 6:
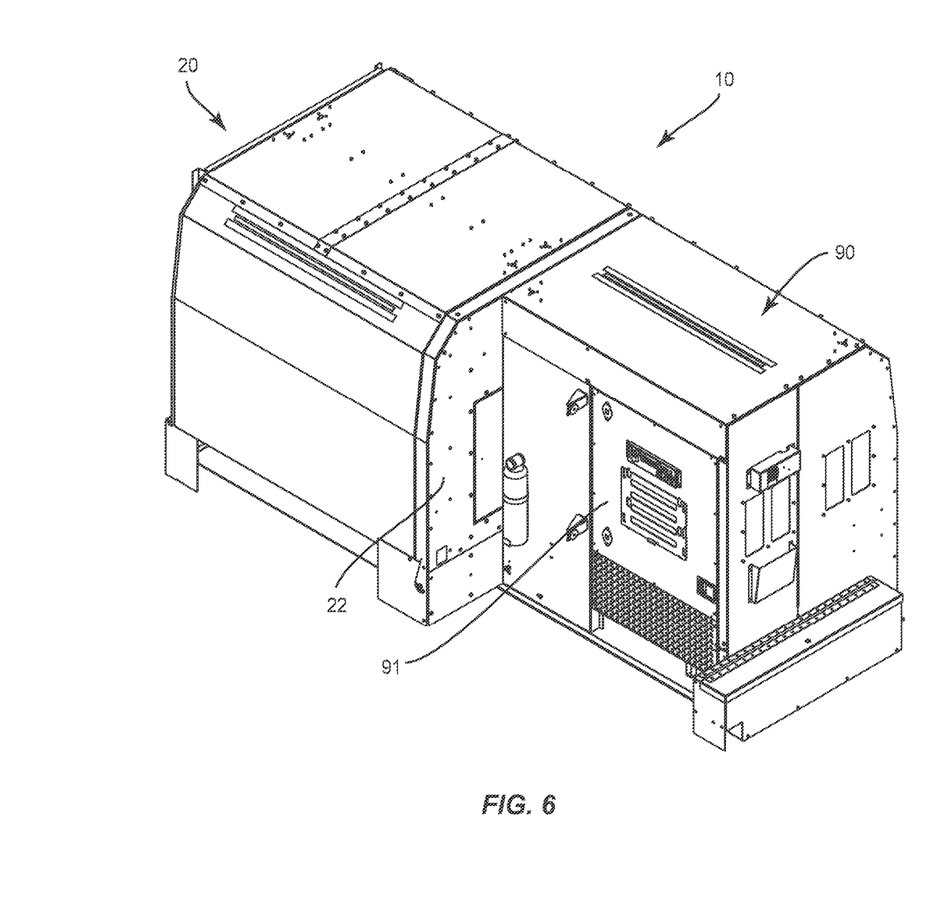
FIG. 6 is a rear perspective view of an enclosure.

In one aspect, the enclosure 10 includes a single holding cell 50. As discussed above, the holding cell 50 may be further divided into separate sections by a divider wall 53. FIG. 6 includes another aspect with a second holding cell formed within a second body 90. The second body 90 is positioned at the rear side 22 of the body 20 such that the enclosure 10 can fit within the interior of a cargo van. The second body 90 includes a door 91 that leads into the second holding cell. In one aspect, the second body 90 forms a portion or entirety of the rear side of the holding cell 50.

In use, the enclosure 10 is assembled within the interior of the cargo van. The size of the different components provides for insertion into the cargo space of the van. The components are then positioned in the cargo space and assembled by being connected together with mechanical fasteners. In one aspect, the first side 21 with the opening 26 is positioned facing the rear doors of the vehicle. In an embodiment with two holding cells 50 as illustrated in FIG. 6, the door 91 to the second holding cell is positioned facing the side doors of the vehicle.

When assembled within the vehicle, the vehicle may form portions of the different aspects of the enclosure 10. In one aspect, the sides of the vehicle form a portion of the outer walls that form the storage compartments 40. In another aspect, the floor of the cargo area may form the floor of the holding cell and/or the storage compartments.

When transporting a person, the doors 30 are moved to the open position. The persons are moved through the opening 26 and into the holding cell 50. Once inserted, the doors 30 are moved to the closed position thus enclosing the holding cell 50. The doors 30 are locked thus securing the persons in the holding cell 50. The orientation of the enclosure 10 in the vehicle provides for the persons sitting on the benches 70 to be facing the side of the vehicle.

The storage compartments 40 are accessible to security persons standing at the rear of the vehicle. The security persons can open the doors 75 and reach into the storage compartments 40 to retrieve or insert the materials. Once completed, the doors 75 are closed and locked.

The materials in the storage compartments 40 are not accessible by the persons contained in the holding cell 50. The storage compartments 40 are isolated from the holding cell 50 by the benches 70. Further, the open first end 73 of the storage compartments 40 are located outside of the holding cell 50 thus again preventing access.

The enclosure 10 is sized to fit within a variety of different vehicles. Examples of such vehicles include but are not limited to the Ford T350 and T250 cargo vans, the Chevrolet EXPRESS 3500 and EXPRESS 2500 cargo vans, the Dodge PROMASTER 3500 and PROMASTER 2500 cargo vans, the GMC SAVANA cargo van, and variety of trucks, vans, and sports utility vehicles.

The various components may be attached together by mechanical fasteners. This may include safety bolts and nuts are used to secure the various components together. The components may also be configured to mechanically interlock together, such as with interlocking slots and tabs.

The modular construction of the enclosure 10 facilitates the assembly and disassembly within the cargo area of the van. The modular nature of the enclosure 10 also facilitates disassembly and removal in the event that the vehicle is damaged or taken out of service.

The present invention provides a means of outfitting widely available transport vans with an apparatus for the secure containment and transportation of prisoners. Sectional construction and the use of fasteners or other interlocking devices to interconnect the components also provides a non-permanent and reusable containment structure. Thus, the present invention is cost-effective in that specialized prisoner transport vehicles do not have to be purchased by the user; an ordinary commercially available passenger van is sufficient. Furthermore, if the van has been wrecked or once the service life of the van has been reached, the structure may be removed and installed in another van. Finally, the sectional construction facilitates modifications of selected components and customization of the structure to meet the requirements of different situations.

The enclosures 10 disclosed above include a pair of benches 70 that are spaced apart within the holding cell 50. Another aspect includes a single bench 70 positioned within the holding cell 50. This may include being positioned against one of the lateral sides 25. Just a single one of the doors 30 includes a notch 39 that aligns with the end of the bench 70 that leads into the storage compartment underneath. The other door 30 does not include a notch 39.

The enclosure 10 may also include a camera mounted to the exterior of one of the doors 30. The door includes an opening into the holding cell where the camera is aimed. The opening further includes a grill, transparent protective panel, or other like protective member to prevent access to the camera by a person within the holding cell 50. Positioning the camera on the exterior of the door 30 provides an increased field of vision. The camera is positioned on the exterior of the holding cell 50 thus preventing tampering.

One aspect includes a portion of the enclosure constructed from high-density polyethylene (HDPE). This may include the floor 24 and benches 70. These may be formed from a single HDPE member or two or more members that are attached together. The remainder of the enclosure 10 is constructed from metal panels as described above. These panels are secured to the lower HDPE section(s) using mechanical fasteners. The HDPE may facilitate cleaning or spraying out the holding cell 50 with a hose, anti-slip features may be formed into the sections, recessed sections on the seats to receive cushions.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. An enclosure for transporting a person within a vehicle, the enclosure comprising:
   a body that extends around and forms an interior holding cell, the body comprising an opening in a first side that is sized for the person to enter into the holding cell and to exit from the holding cell;
   first and second benches positioned within the holding cell and each comprising a seat and a wall that extends downward from the seat;
   a first compartment positioned under the first bench and a second compartment positioned under the second bench, the first compartment being isolated from the holding cell by at least the seat and the wall of the first bench and the second compartment being isolated from the holding cell by at least the seat and the wall of the second bench, each of the first and second compartments comprising an open end positioned at the opening in the body;
   first and second doors hingedly mounted to the body on opposing sides of the opening, the first and second doors being movable between an open position to expose the opening and allow access to and from the holding cell and a closed position that extend across the opening and enclose the holding cell;
   a first notch located in the first door that aligns with the open end of the first compartment when the first door is in the closed position;
   a second notch located in the second door that aligns with the open end of the second compartment when the second door is in the closed position;
   the open ends of each of the first and second compartments being isolated from the enclosed holding cell when the first and second doors are in the closed position.

2. The enclosure of claim 1, wherein the first bench is connected to and extends outward into the holding cell from a first lateral side of the body and the second bench is connected to and extends outward into the holding cell from a second lateral side of the body.

3. The enclosure of claim 2, wherein the wall of the first seat is connected to a floor of the body and the wall of the second seat is connected to the floor of the body.

4. The enclosure of claim 1, wherein the open ends of each of the first and second compartments are aligned with the opening in the body.

5. The enclosure of claim 1, further comprising a post positioned at the opening of the body, the post comprising a first end that is connected to a floor of the body and a second end that is connected to an upper section of the body.

6. The enclosure of claim 5, wherein each of the doors are spaced away from the post in the open position and are connected to the post in the closed position.

7. The enclosure of claim 1, wherein each of the benches extends along an entire length of the holding cell.

8. The enclosure of claim 1, further comprising compartment doors that extend across each of the first and second compartments at the opening, the doors being movable between open and closed positions.

9. An enclosure for transporting persons within a vehicle, the enclosure comprising:
- a body with a holding cell having a length, width, and height, the length formed between a first side and an opposing second side, the width formed between first and second lateral sides that are spaced apart and that extend between the first and second sides, and the height formed between a floor and a top that is attached to the first and second laterals;
- an opening positioned in the first side of the body and that is in communication with the holding cell;
- a first compartment that extends along the length of the holding cell and that is formed at least in part by the body, the first compartment being isolated from the holding cell by the body, the first compartment comprising an open end that is aligned with the opening in the body;
- a second compartment that extends along the length of the holding cell and that is formed at least in part by the body, the second compartment being isolated from the holding cell by the body, the second compartment comprising an open end that is aligned with the opening in the body;
- first and second doors hingedly mounted to the first side of the body on opposing sides of the opening, the first and second doors being movable between an open position to allow access to the holding cell and a closed position that extend across the opening and enclose the holding cell;
- a first notch located in the first door that aligns with the open end of the first compartment in the closed position;
- a second notch located in the second door that aligns with the open end of the second compartment in the closed position;
- the open ends of each of the first and second compartments being isolated from the enclosed holding cell when the first and second doors are in the closed position.

10. The enclosure of claim 9, further comprising a first bench positioned in the holding cell and comprising a seat and a foot section that extends from the seat, the first bench positioned to isolate the first compartment from the holding cell.

11. The enclosure of claim 10, further comprising a second bench positioned in the holding cell and being spaced apart from the first bench, the second bench comprising a seat and a foot section that extends from the seat, the second bench positioned to isolate the second compartment from the holding cell.

12. The enclosure of claim 11, wherein the seat of the first bench is positioned over the first compartment and the seat of the second bench is positioned over the second compartment.

13. The enclosure of claim 9, further comprising a post positioned at the opening of the body, the post comprising a first end that is connected to the floor and a second end that is connected to the top.

14. The enclosure of claim 13, wherein each of the doors are spaced away from the post in the open position and are connected to the post in the closed position.

15. An enclosure for transporting persons within a vehicle, the enclosure comprising:
- a body that extends around and forms an interior holding cell, the body comprising an opening in a first side and that is in communication with the holding cell;
- first and second benches positioned within the holding cell;
- a first compartment positioned underneath the first bench, the first compartment being positioned outside of the holding cell;
- a first access door positioned at the first compartment;
- a second compartment positioned underneath the second bench, the second compartment being positioned outside of the holding cell;
- a second access door positioned at the second compartment;
- first and second main doors hingedly mounted to the body on opposing sides of the opening, the first and second main doors being movable between an open position to allow access to the holding cell and a closed position that extend across the opening and enclose the holding cell;
- a first notch located in the first main door that aligns with the first access door of the first compartment in the closed position;
- a second notch located in the second door that aligns with the second access door of the second compartment in the closed position;
- the first and second access doors being positioned outside of the holding cell.

16. The enclosure of claim 15, wherein the first compartment comprising an first open end that is aligned with the opening in the body and with the first access door sized and positioned to extend across the first open end.

17. The enclosure of claim 16, wherein the second compartment comprising an second open end that is aligned with the opening in the body and with the second access door extending across the second open end.

18. The enclosure of claim 16, wherein the first access door and the first notch having a common shape and size.

19. The enclosure of claim 18, wherein the second access door and the second notch having a common shape and size.

20. The enclosure of claim 15, wherein the first and second main doors have a common shape and size.

* * * * *